US 8,719,284 B2

May 6, 2014

(12) United States Patent
Schirmer et al.

(10) Patent No.: US 8,719,284 B2
(45) Date of Patent: May 6, 2014

(54) METHOD, SYSTEM AND PROGRAM PRODUCT FOR FILTERING AN ENTRY OF DATA ITEMS

(75) Inventors: Andrew L. Schirmer, Andover, MA (US); Marijane M. Zeller, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 1780 days.

(21) Appl. No.: 10/322,954

(22) Filed: Dec. 18, 2002

(65) Prior Publication Data

US 2004/0122801 A1    Jun. 24, 2004

(51) Int. Cl.
*G06F 17/30* (2006.01)

(52) U.S. Cl.
USPC .......................................................... 707/754

(58) Field of Classification Search
USPC .............. 707/1, 3, 6, 9, 754; 717/174; 705/14
See application file for complete search history.

(56) References Cited

U.S. PATENT DOCUMENTS

| | | | |
|---|---|---|---|
| 5,963,951 A * | 10/1999 | Collins | 707/102 |
| 6,016,499 A | 1/2000 | Ferguson | |
| 6,061,681 A | 5/2000 | Collins | |
| 6,199,062 B1 | 3/2001 | Byrne et al. | |
| 6,205,472 B1 | 3/2001 | Gilmour | |
| 6,208,986 B1 | 3/2001 | Schneck et al. | |
| 6,253,202 B1 * | 6/2001 | Gilmour | 707/9 |
| 6,470,332 B1 * | 10/2002 | Weschler | 707/3 |
| 2002/0016727 A1 | 2/2002 | Harrell et al. | |
| 2002/0024532 A1 | 2/2002 | Fables et al. | |
| 2002/0052873 A1 | 5/2002 | Delgado et al. | |
| 2002/0055870 A1 * | 5/2002 | Thomas | 705/10 |
| 2002/0059201 A1 | 5/2002 | Work | |
| 2002/0059204 A1 | 5/2002 | Harris | |
| 2002/0103792 A1 | 8/2002 | Blank et al. | |
| 2002/0147701 A1 | 10/2002 | Chang | |
| 2003/0115193 A1 * | 6/2003 | Okamoto et al. | 707/3 |
| 2003/0126108 A1 * | 7/2003 | Martino et al. | 707/1 |
| 2003/0191673 A1 * | 10/2003 | Cohen | 705/5 |

OTHER PUBLICATIONS

IBM Research Disclosure No. 41695, "Implement LDAP Search Queries with SQL", Dec. 1998, pp. 1663-1665.

* cited by examiner

*Primary Examiner* — Apu Mofiz
*Assistant Examiner* — Chelcie Daye
(74) *Attorney, Agent, or Firm* — Jeff Tang; Hoffman Warnick LLC

(57) ABSTRACT

A request corresponding to a target user is received from a querying user. The request can specifically identify the target user, or it could include a search criteria that results in identification of one or more target users. In any event, once the request is received, entries of data items (e.g., user profiles) associated with the target user(s) and the querying user (or some other user) are accessed. Based on the data items in the querying user's profile (or the other user's profile), the data items in the target user's profiles are filtered so that the querying user is not presented with an overload of information. Once the target user's profile has been filtered, it will be presented to the querying user.

24 Claims, 3 Drawing Sheets

NAME: JOE SMITH

AGE: 42

ADDRESS: 123 SMITH LANE ← 52
SMITH, NY 12180

COMPANY: SOFTWARE INDUSTRIES, INC.

DEPARTMENT: PRODUCT SUPPORT

CITY OF BIRTH: YORKTOWN, N.Y.

COLLEGE: RENSSELAER POLYTECHNIC INSTITUTE

YEAR OF GRADUATION: 1982

ADVANCE DEGREE(S): M.S. COMPUTER ENGINEERING

GRADUATE SCHOOL(S): MIT

YEAR OF GRADUATION: 1984

HIGH SCHOOL: LAKELAND SENIOR HIGH SCHOOL

YEAR OF GRADUATION: 1978

---

54

NAME: MIKE JONES

AGE: 37 ← 56

ADDRESS: 428 WHARTON DRIVE
JOHNSON, NY 10528

COMPANY: GENERAL MOTORS

DEPARTMENT: R&D

CITY OF BIRTH: YORKTOWN, N.Y.

COLLEGE: S.U.N.Y. ALBANY

YEAR OF GRADUATION: 1987

ADVANCE DEGREE(S): M.S. MECHANICAL ENGINEERING

GRADUATE SCHOOL(S): RENSSELAER POLYTECHNIC INSTITUTE

YEAR OF GRADUATION: 1984

HIGH SCHOOL: LAKELAND SENIOR HIGH SCHOOL

YEAR OF GRADUATION: 1983

NAME: JOE SMITH

AGE: 42

ADDRESS: 123 SMITH LANE
SMITH, NY 12180

COMPANY: SOFTWARE INDUSTRIES, INC.

DEPARTMENT: PRODUCT SUPPORT

CITY OF BIRTH: YORKTOWN, N.Y.

COLLEGE: RENSSELAER POLYTECHNIC
INSTITUTE

YEAR OF GRADUATION: 1982

ADVANCE DEGREE(S): M.S. COMPUTER
ENGINEERING

GRADUATE SCHOOL(S): MIT

YEAR OF GRADUATION: 1984

HIGH SCHOOL: LAKELAND SENIOR HIGH
SCHOOL

YEAR OF GRADUATION: 1978

56 →

NAME: MIKE JONES

AGE:

ADDRESS:

COMPANY:

DEPARTMENT:

CITY OF BIRTH: YORKTOWN, N.Y.

COLLEGE:

YEAR OF GRADUATION:

ADVANCE DEGREE(S): M.S. MECHANICAL
ENGINEERING

GRADUATE SCHOOL(S): RENSSELAER
POLYTECHNIC INSTITUTE

YEAR OF GRADUATION: 1984

HIGH SCHOOL: LAKELAND SENIOR HIGH
SCHOOL

YEAR OF GRADUATION: 1983

METHOD, SYSTEM AND PROGRAM PRODUCT FOR FILTERING AN ENTRY OF DATA ITEMS

BACKGROUND OF THE INVENTION

1. Field of the Invention

The present invention generally relates to a method, system and program product for filtering an entry of data items such as a user profile. Specifically, under the present invention a profile of data items associated with a target user is filtered based on a profile of data items associated with another user.

2. Background Art

In the course of their daily lives, people make frequent connections to one another for various reasons. For example, connections are often made to obtain information, advice, or approval. Moreover, many connections are made for networking purposes. The explosion of computer technology has dramatically helped foster forming connections that were not previously likely. In many cases, people seeking to make connections today will utilize data items (information) contained within a user profile. To this extent, various systems exist for maintaining and providing access to user profiles. One example of such a system is Lotus Discovery Server, which is commercially available from International Business Machines of Armonk, N.Y.

To date, the quality of a profile has been judged based on the quantity of data items contained therein. The thought has been that the more data items available in a profile, the better a connection-seeking user will be able to judge whether a connection is appropriate. Unfortunately, more information comes at the cost of introducing noise and information overload. Specifically, the connection-seeking user must observe and/or review all of the data items in the profile. Such a requirement can take considerable time and be tedious to the connection-seeking user.

Although various search-based systems exist for allowing a user to form a specifically crafted query so as to return only relevant "hits," such systems are both error-prone and tedious. Specifically, the searching user must often anticipate the type of terminology/language used in the body of information being searched, and then craft a query that should return the appropriate information. However, such a process is typically wrought with inaccurate queries and irrelevant "hits."

In view of the foregoing, there exists a need for a method, system and program product for filtering an entry of data items such as a user profile. Specifically, a need exists for a system that can filter the data items in a profile of a target user based on the data items in the profile of the querying user so that only relevant information is returned to the querying user.

SUMMARY OF THE INVENTION

In general, the present invention provides a method, system and program product for filtering an entry of data items such as a user profile. Specifically, a request corresponding to a target user is received from a querying user. The request can specifically identify the target user, or it could include a search criteria that would identify one or more target users. In any event, once the request is received, entries (e.g., profiles of data items) associated with the target user and the querying user (or some other user) are accessed. Based on the data items in the querying user's entry (or the other user's entry), the data items in the target user's entry are filtered. In a typical embodiment, the data items in the target user's entry that are not relevant to data items in the querying user's entry (or the other user's entry) will be hidden from view in the target user's entry. Once the target user's entry has been filtered, it will be presented to the querying user. Thus, under the present invention, the querying user is not presented with an overload of information.

According to a first aspect of the present invention, a method for filtering an entry of data items is provided. The method comprises: (1) receiving a request corresponding to a target user from a querying user, wherein the target user has an associated entry of data items; and (2) filtering the entry of data items associated with the target user based on an entry of data items associated with another user.

According to a second aspect of the present invention, a method for filtering a profile of data items is provided. The method comprises: (1) receiving an identification of a target user from a querying user, wherein the querying user and the target user each have an associated profile of data items; (2) hiding at least one of the data items in the profile of data items associated with the target user based on the profile of data items associated with the querying user; and (3) presenting the filtered profile of data items associated with the target user to the querying user.

According to a third aspect of the present invention, a system for filtering an entry of data items is provided. The system comprises: (1) an input system for receiving a request corresponding to a target user from a querying user, wherein the target user has an associated entry of data items; and (2) a filter system for filtering the entry of data items associated with the target user based on the entry of data items associated with another user.

According to a fourth aspect of the present invention, a program product stored on a recordable medium for filtering an entry of data items is provided. When executed, the program product comprises: (1) program code for receiving a request corresponding to a target user from a querying user, wherein the target user has an associated entry of data items; and (2) program code for filtering the entry of data items associated with the target user based on the entry of data items associated with another user.

Therefore, the present invention provides a method, system and program product for filtering an entry of data items such as a user profile.

BRIEF DESCRIPTION OF THE DRAWINGS

These and other features of this invention will be more readily understood from the following detailed description of the various aspects of the invention taken in conjunction with the accompanying drawings in which:

FIG. 2 depicts a querying user's profile of data items and a target user's profile of data items.

FIG. 3 depicts the target user's profile of data items after being filtered based on the querying user's profile of data items.

Figure 1:
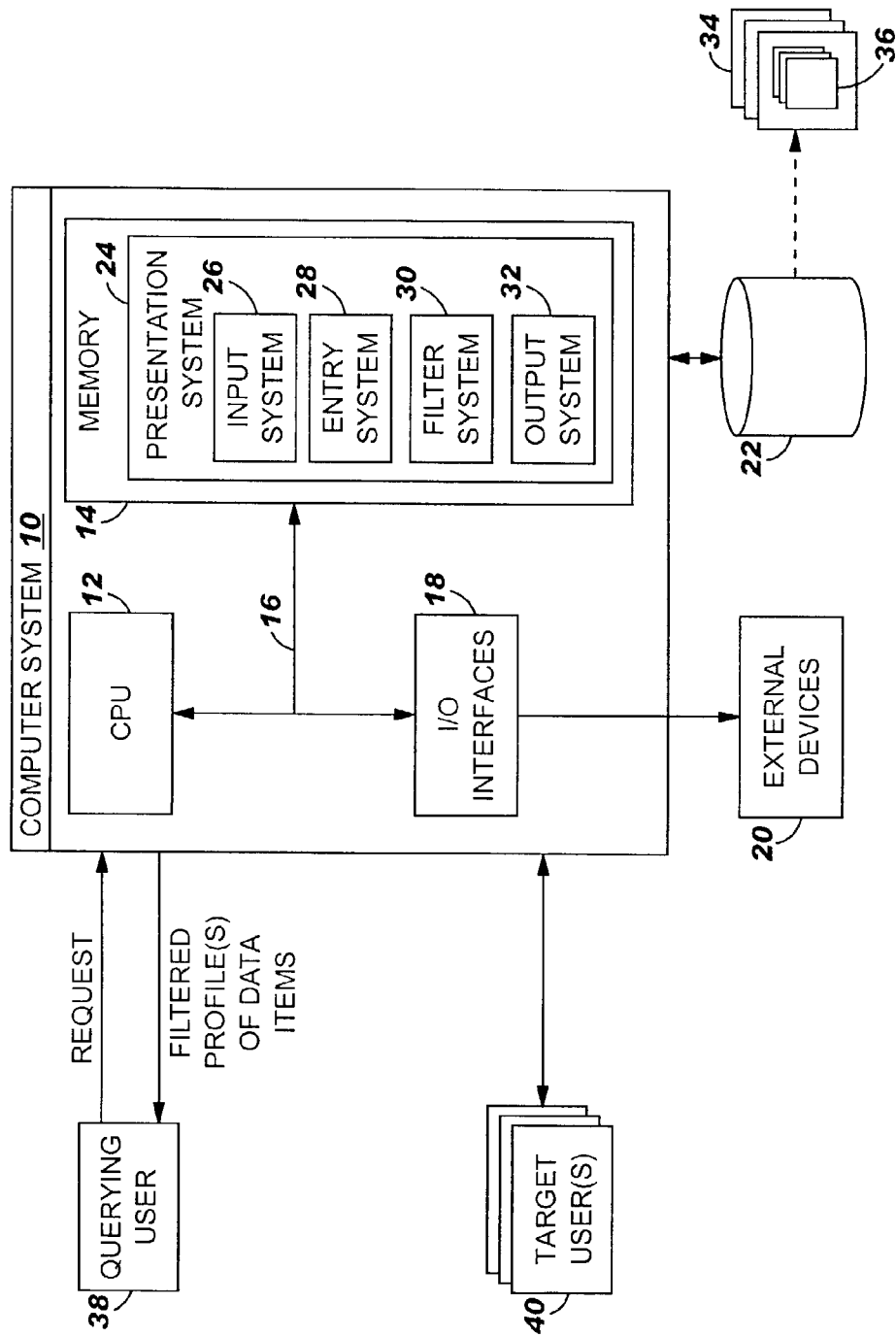
FIG. 1 depicts a computer system having a presentation system for filtering an entry of data items, according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system and program product for filtering an entry of data items such as a user profile. Specifically, a request corresponding to a target user is received from a querying user. The request can specifically identify the target user, or it could include a search criteria that would identify one or more target users. In any event, once the request is received, entries (e.g., profiles of data items) associated with the target user and the querying user (or some other user) are accessed. Based on the data items in the querying user's entry (or the other user's entry), the data items in the target user's entry are filtered. In a typical embodiment, the data items in the target user's entry that are not relevant to data items in the querying user's entry (or the other user's entry) will be hidden from view in the target user's entry. Once the target user's entry has been filtered, it will be presented to the querying user. Thus, under the present invention, the querying user is not presented with an overload of information. Rather, the querying user is presented with a "personalized" view of the target user's entry.

Referring now to FIG. 1, computer system 10 having presentation system 24 is shown. In general, computer system 10 is intended to represent any type of computerized system that can be accessed by querying user 38 and/or target users 40. To this extent, as will be further described below, computer system 10 can be any computerized system capable of accessing and filtering profiles of data items. As depicted, computer system 10 generally comprises central processing unit (CPU) 12, memory 14, bus 16, input/output (I/O) interfaces 18, external devices/resources 20 and database 22. CPU 12 may comprise a single processing unit, or be distributed across one or more processing units in one or more locations, e.g., on a client and server. Memory 14 may comprise any known type of data storage and/or transmission media, including magnetic media, optical media, random access memory (RAM), read-only memory (ROM), a data cache, a data object, etc. Moreover, similar to CPU 12, memory 14 may reside at a single physical location, comprising one or more types of data storage, or be distributed across a plurality of physical systems in various forms.

I/O interfaces 18 may comprise any system for exchanging information to/from an external source. External devices/resources 20 may comprise any known type of external device, including speakers, a CRT, LED screen, hand-held device, keyboard, mouse, voice recognition system, speech output system, printer, monitor, facsimile, pager, etc. Bus 16 provides a communication link between each of the components in computer system 10 and likewise may comprise any known type of transmission link, including electrical, optical, wireless, etc. In addition, although not shown, additional components, such as cache memory, communication systems, system software, etc., may be incorporated into computer system 10.

Database 22 provides storage for information under the present invention. Such information could include, for example, profiles 34 (entries) of data items 36, filtration criteria/rules, etc. As such, database 22 may include one or more storage devices, such as a magnetic disk drive or an optical disk drive. In another embodiment, database 22 includes data distributed across, for example, a local area network (LAN), wide area network (WAN) or a storage area network (SAN) (not shown). Database 22 may also be configured in such a way that one of ordinary skill in the art may interpret it to include one or more storage devices.

It should be understood that querying user 38 and target users 40 could communicate with computer system 10 via a direct hardwired connection (e.g., serial port), or via an addressable connection in a client-server (or server-server) environment that may utilize any combination of wireline and/or wireless transmission methods. In the case of the latter, the server and client may be connected via the Internet, a wide area network (WAN), a local area network (LAN), a virtual private network (VPN) or other private network. The server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

Should querying user 38 and/or target users 40 not access computer system 10 directly, querying user 38 and/or target users 40 would typically operate a computerized system (e.g., personal computer, workstation, personal digital assistant, etc.) that includes computerized components (e.g., CPU, memory, etc.) similar to computer system 10. Such systems have not been shown for brevity purposes.

In any event, all users, including querying user 38 and target users 40 are each associated with an entry of data items such as user profiles. Such entries are typically stored prior to or concurrent with execution of the present invention (e.g., in database 22). To this extent, the entries could be established, stored and/or updated using any technology now known or later developed. Such technology could be provided within memory 14 of computer system 10, although this need not be the case. For example, the profiles could have been provided from an external computer system (not shown) and stored in database 22 for computer system 10 to access.

It should be understood that in advance that, in an illustrative embodiment, the term "entries" refers to "user profiles" as stored in database 22 (or some other type of storage). To this extent, each profile generally includes one or more attributes (e.g., Name, Date of Birth, etc.) that are each associated with a set (i.e., one or more) of data items (e.g., Name—Joe Smith). It should be recognized, however, that the present invention can be used in conjunction with any "arrangement of information" and is not limited to "user profiles."

Under the present invention, querying user 38 will issue a request corresponding to one or more target users 40. The request can specifically identify a particular target user 40, or could include search criteria that are capable of identifying one or more target users 40. For example, in the case of the former, the request could include a user identification that corresponds to target user "Mike Jones." Alternatively, in the case of the latter, the request could include a search criterion such as "identify all users that graduated from my high school." Such a search request could correspond to one or more specific target users. Regardless of the format of the request, it will be received by input system 26 of presentation system 24. Upon receipt, entry system 28 will access entries (e.g., profiles of data items within database 22) associated with querying user 38 and any target users 40 identified by the request. To this extent, if the request included the identification for "Mike Jones," entry system 28 will retrieve the profile of data items associated with "Mike Jones" (as well as that associated with querying user 38). Alternatively, if the request included a search criterion such as that illustrated above, entry system 28 will perform the necessary query of database 22 to access the relevant profile(s).

Referring now to FIG. 2, illustrative profiles 50 and 54 of data items 52 and 56 for querying user 38 "Joe Smith" and target user 40 "Mike Jones" are shown. FIG. 2 is intended to illustrate the scenario where a specific identification for "Mike Jones" was included in the request. It should be understood that if search criteria were used, more than one target user could have been identified. The scenario shown in FIG. 2 is depicted for illustrative purposes only. In any event, in comparing profiles 50 and 54, it can be seen that some data items 52 and 56 are similar or related (if not identical), while some are entirely distinct. Under previous systems, a request for "Mike Jones" profile would have resulted in every data item 56 therein being presented to querying user 38. As indicated above, such a method of presentation could be extremely inefficient and tedious for querying user 38. Under the present invention, profile 54 of data items 56 will be filtered so that only relevant data items will be presented to querying user 38.

Specifically, once profiles 50 and 54 have been accessed (but before anything is presented/displayed for querying user 38), filter system 30 of FIG. 1 will hide from view (e.g., remove) any data items 56 in profile 54 that are not useful to querying user 38 (i.e., relevant to data items 52 in querying user 38's profile 50). To this extent, filter system 30 could implement any type of filter criteria and/or rules. For example, filter system 30 could hide all data items 56 in profile 54 that are not identical or at least similar (in appearance) to data items 52 in profile 50. Leaving similar data items intact within profile 54 would account for the situation where different terminology is used to refer to the same item of information. For example, if profile 54 had indicated "Massachusetts Institute of Technology" as a college or graduate school, it should not be filtered out because simply it differs in appearance from "MIT" as indicated in profile 50. The present invention could also define certain data items 56 that should always remain. For example, the rules could dictate that target user 40's name must never be hidden in profile 54.

In another embodiment, filter system 30 could hide any data items 56 that are not deemed to be "related" to data items 52. In determining what data items are related, filter system 30 could be preprogrammed with, or have access to, a table of data items that were previously determined to be related. For example, all user profiles 34 (FIG. 1) could be established using a common taxonomy or library of terms. In such a case, a table of related terms could be provided that indicates what terms in the library are related to others. If a particular data item 56 in profile 54 uses a term (e.g., mechanical engineering) that was indicated as being related to a term (e.g., computer engineering) used in profile 50, then filter system 30 could allow that data item 56 to remain in profile 54.

It should be understood that the methods of filtering profile 54 discussed herein are intended to be illustrative examples only. To this extent, it should be appreciated that any method of filtering profile 54 (i.e., removing data items 56) based on profile 50 (i.e., based on data items 52) could be implemented under the scope of the present invention.

Referring now to FIG. 3, querying user 38's profile 50 and target user 40's filtered profile 58 are depicted. As shown, several data items 56 have been hidden from view in profile 54 to yield filtered profile 58. Specifically, filter system 30 has left only the data items that were relevant (e.g., identical, similar or related) to data items 52. For example, as can been seen "Mike Jones", and Joe Smith" attended the same high school (e.g., Lakeland Senior High School) and institute of higher learning (e.g., Rensselaer Polytechnic Institute). Although they graduated during different years, and with different degrees, filter system 30 has left this information because it could be useful to querying user 38. Thus, as indicated above filter system 30 need not leave only data items 56 that are identical or similar in appearance to data items 52. In addition, although not shown as such, filter system 30 could also hide (i.e., hide from view) the attribute labels (e.g., Age, Address, etc.) corresponding to hidden data items to further reduce the amount of non-relevant information presented to querying user 38. Thus, for example, the attribute labels of "Age," "Address," "Company," "Department" and "College" could have been hidden from view in filtered profile 58.

In any event, once filtered profile 58 of data items 56 has been established, output system 32 (FIG. 1) will present filtered profile 58 to querying user 38. Presentation of filtered profile 58 can be accomplished in any manner. Specifically, any set of user interfaces (e.g., in computer system 10 and/or in a computerized system operated by querying user 38) can be provided to present (e.g., display) lists, filtered profiles, e-mail notifications, reports, etc. to querying user 38.

It should be understood that filtering target user's profile 54 based on querying user's profile 50 is only one way to carry out the present invention. Specifically, target user's profile 54 could be filtered based on any other user(s)' profile. For example, if user "A" is the querying user and user "B" is the target user, user "B's" profile could be filtered based on user "C's" and/or user "D's" profile. To this extent, the request issued by querying user 38 could identify one or more users (including querying user 38) whose profiles should be used to filter target user's profile 54. It should also be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A computer implemented method for filtering an entry of data items to eliminate unnecessary information, comprising:

associating each of a plurality of users with an entry of data items, wherein each data item in the entry of data items includes information containing a characteristic of a user corresponding to the entry of data items;

receiving a request from a querying user of the plurality of users having at least one query term corresponding to a data item;

returning an entry of data items corresponding to a target user, wherein the entry of data items includes at least one data item corresponding to the at least one query term;

comparing each entry in the entry of data items corresponding to the target user with a corresponding entry in the entry of data items corresponding to the querying user to determine whether an informational content of the each data item is identical;

comparing each entry in the entry of data items corresponding to the target user with a corresponding entry in the entry of data items corresponding to the querying user to determine whether the informational content of the each data item is similar, wherein the informational content is determined to be similar if different terminology is used to refer to a same item of information;

comparing each entry in the entry of data items corresponding to the target user with a corresponding entry in the entry of data items corresponding to the querying user to determine whether the informational content of the each data item is related; wherein the informational content is related if the informational content is defined as related in a database of related items;

filtering the entry of data items associated with the target user that is displayed to display all data items in the entry of data items corresponding to the target user all that have been determined to be identical, determined to be similar or determined to be related and only data items in the entry of data items corresponding to the target user all that have been determined to be identical, determined to be similar or determined to be related removing from display all attribute labels the data items that have been removed from display; and presenting the filtered entry of data items associated with the target user to the querying user.

2. The method of claim 1, further comprising accessing the entry of data items associated with the target user and the entry of data items associated with the other user, prior to the filtering step.

3. The method of claim 2, wherein the entry of data items associated with the target user is accessed based on the request, and wherein the request includes an identification of the target user.

4. The method of claim 2, wherein the entry of data items associated with the target user is accessed based on the request, and wherein the request includes a search criteria for identifying the target user.

5. The method of claim 1, wherein the entry of data items associated with the other user and the entry of data items associated with the target user are profiles stored in a database, and wherein the database includes a plurality of profiles of data items associated with a plurality of users.

6. The method of claim 1, wherein the filtering step comprises hiding at least one of the unrelated data items in the entry of data items associated with the target user based on the entry of data items associated with the other user.

7. The method of claim 1, wherein the other user is the querying user.

8. A computer implemented method for filtering a profile of data items, comprising:

associating each of a plurality of users with an entry of data items, wherein each data item in the entry of data items includes information containing a characteristic of a user corresponding to the entry of data items;

receiving a request from a querying user of the plurality of users having at least one query term corresponding to a data item;

returning an entry of data items corresponding to a target user, wherein the entry of data items includes at least one data item corresponding to the at least one query term;

comparing each entry in the entry of data items corresponding to the target user with a corresponding entry in the entry of data items corresponding to the querying user to determine whether an informational content of the each data item is identical;

comparing each entry in the entry of data items corresponding to the target user with a corresponding entry in the entry of data items corresponding to the querying user to determine whether the informational content of the each data item is similar, wherein the informational content is determined to be similar if different terminology is used to refer to a same item of information;

comparing each entry in the entry of data items corresponding to the target user with a corresponding entry in the entry of data items corresponding to the querying user to determine whether the informational content of the each data item is related; wherein the informational content is related if the informational content is defined as related in a database of related items;

hiding all of the data items in the profile of data items associated with the target user that have been determined to be none of: similar, matching, and related to corresponding data items in the profile of data items associated with the querying user and displaying all data items in the entry of data items corresponding to the target user all that have been determined to be identical, determined to be similar or determined to be related;

removing from display all attribute labels the data items that have been hidden from display; and presenting the filtered profile of data items associated with the target user to the querying user.

9. The method of claim 8, wherein the profile of data items associated with the querying user and the profile of data items associated with the target user are stored in a database, and wherein the database includes a plurality of profiles of data items associated with a plurality of users.

10. The method of claim 8, further comprising accessing the profile of data items associated with the target user and the profile of data items associated with the querying user in the database, prior to the hiding step.

11. A computer implemented system for filtering an entry of data items to eliminate unnecessary information, comprising at least one computer device that performs a method, comprising:

receiving a request from a querying user of the plurality of users having at least one query term corresponding to a data item;

returning an entry of data items corresponding to a target user, wherein the entry of data items includes at least one data item corresponding to the at least one query term;

comparing each entry in the entry of data items corresponding to the target user with a corresponding entry in the entry of data items corresponding to the querying user to determine whether an informational content of the each data item is identical;

comparing each entry in the entry of data items corresponding to the target user with a corresponding entry in the entry of data items corresponding to the querying user to determine whether the informational content of the each data item is similar, wherein the informational content is determined to be similar if different terminology is used to refer to a same item of information;

comparing each entry in the entry of data items corresponding to the target user with a corresponding entry in the entry of data items corresponding to the querying user to determine whether the informational content of the each data item is related; wherein the informational content is related if the informational content is defined as related in a database of related items;

filtering the entry of data items associated with the target user that is displayed to display all data items in the entry of data items corresponding to the target user all that have been determined to be identical, determined to be similar or determined to be related and only data items in the entry of data items corresponding to the target user all that have been determined to be identical, determined to be similar or determined to be related removing from display all attribute labels the data items that have been removed from display; and presenting the filtered entry of data items associated with the target user to the querying user.

12. The system of claim 11, further comprising accessing the entry of data items associated with the target user and the entry of data items associated with the other user, prior to filtering the entry of data items associated with the target user.

13. The system of claim 12, wherein the entry of data items associated with the target user is accessed based on the request, and wherein the request includes an identification of the target user.

14. The system of claim 12, wherein entry of data items associated with the target user is accessed based on the request, and wherein the request includes a search criteria for identifying the target user.

15. The system of claim 11, wherein the entry of data items associated with the other user and the entry of data items associated with the target user are profiles of data items stored in a database, and wherein the database includes a plurality of profiles of data items associated with a plurality of users.

16. The system of claim 11, wherein the filter system hides at least one of the unrelated data items in the entry of data items associated with the target user based on the entry of data items associated with the other user.

17. The system of claim 11, wherein the other user is the querying user.

18. A program product stored on a computer readable storage device for filtering an entry of data items to eliminate unnecessary information, which, when executed, performs a method, comprising:

associating each of a plurality of users with an entry of data items, wherein each data item in the entry of data items includes information containing a characteristic of a user corresponding to the entry of data items;

receiving a request from a querying user of the plurality of users having at least one query term corresponding to a data item;

returning an entry of data items corresponding to a target user, wherein the entry of data items includes at least one data item corresponding to the at least one query term;

comparing each entry in the entry of data items corresponding to the target user with a corresponding entry in the entry of data items corresponding to the querying user to determine whether an informational content of the each data item is identical;

comparing each entry in the entry of data items corresponding to the target user with a corresponding entry in the entry of data items corresponding to the querying user to determine whether the informational content of the each data item is similar, wherein the informational content is determined to be similar if different terminology is used to refer to a same item of information;

comparing each entry in the entry of data items corresponding to the target user with a corresponding entry in the entry of data items corresponding to the querying user to determine whether the informational content of the each data item is related; wherein the informational content is related if the informational content is defined as related in a database of related items;

filtering the entry of data items associated with the target user that is displayed to display all data items in the entry of data items corresponding to the target user all that have been determined to be identical, determined to be similar or determined to be related and only data items in the entry of data items corresponding to the target user all that have been determined to be identical, determined to be similar or determined to be related removing from display all attribute labels the data items that have been removed from display; and presenting the filtered entry of data items associated with the target user to the querying user.

19. The program product of claim 18, the method further comprising accessing the entry of data items associated with the target user and the entry of data items associated with the other user, prior to filtering the entry of data items associated with the target user.

20. The program product of claim 19, wherein entry of data items associated with the target user is accessed based on the request, and wherein the request includes an identification of the target user.

21. The program product of claim 19, wherein the entry of data items associated with the target user is accessed based on the request, and wherein the request includes a search criteria for identifying the target user.

22. The program product of claim 18, wherein the entry of data items associated with the other user and the entry of data items associated with the target user are profiles of data items stored in a database, and wherein the database includes a plurality of profiles of data items associated with a plurality of users.

23. The program product of claim 18, wherein the program code for filtering hides at least one of the unrelated data items in the entry of data items associated with the target user based on the entry of data items associated with the other user.

24. The program product of claim 18, wherein the other user is the querying user.

* * * * *